United States Patent
Ono

(10) Patent No.: US 12,157,061 B2
(45) Date of Patent: Dec. 3, 2024

(54) PROGRAM, ELECTRONIC DEVICE, METHOD, AND SYSTEM

(71) Applicant: CYGAMES, INC., Tokyo (JP)

(72) Inventor: Yuki Ono, Tokyo (JP)

(73) Assignee: CYGAMES, INC., Tokyo (JP)

( * ) Notice: Subject to any disclaimer, the term of this patent is extended or adjusted under 35 U.S.C. 154(b) by 321 days.

(21) Appl. No.: 17/895,858

(22) Filed: Aug. 25, 2022

(65) Prior Publication Data

US 2022/0410012 A1    Dec. 29, 2022

Related U.S. Application Data

(63) Continuation of application No. PCT/JP2021/007018, filed on Feb. 25, 2021.

(30) Foreign Application Priority Data

Feb. 26, 2020    (JP) ................................ 2020-030095

(51) Int. Cl.
    A63F 13/67    (2014.01)
    A63F 13/2145  (2014.01)
    (Continued)

(52) U.S. Cl.
    CPC .......... *A63F 13/67* (2014.09); *A63F 13/2145* (2014.09); *A63F 13/798* (2014.09); *A63F 13/92* (2014.09)

(58) Field of Classification Search
    None
    See application file for complete search history.

(56) References Cited

U.S. PATENT DOCUMENTS

2003/0092492 A1*  5/2003  Ishii ..................... A63F 13/30
                                              463/42
2008/0227543 A1*  9/2008  Kawase ................ A63F 13/10
                                              463/31

(Continued)

FOREIGN PATENT DOCUMENTS

JP    2013-230236 A    11/2013
JP      5938451 B2      6/2016

OTHER PUBLICATIONS

Office Action issued in counterpart Japanese Patent Application No. 2022-006272 mailed on Mar. 14, 2024 (5 pages).

(Continued)

*Primary Examiner* — Jason T Yen
(74) *Attorney, Agent, or Firm* — Osha Bergman Watanabe & Burton LLP

(57) ABSTRACT

An electronic device 10 includes: a setting unit 231 that sets an association between a first game medium that is selected by a player and that serves as an operation target in the game and a second game medium that is selected by the player; a skip-processing-procedure deciding unit 232 that decides, on the basis of priorities respectively associated with skill-related processing procedures of the first game medium and the second game medium, the skill-related processing procedure that becomes a skip target; and a skill-processing-procedure executing unit 233 that executes skill processing procedures respectively associated with the first game medium and the second game medium on the basis of a player input, wherein the skill-processing-procedure executing unit 233 skips the decided skill-related processing procedure when the skill processing procedures associated with the first game medium and the second game medium are executed.

11 Claims, 8 Drawing Sheets

(51) Int. Cl.
   *A63F 13/798*   (2014.01)
   *A63F 13/92*    (2014.01)

(56) References Cited

U.S. PATENT DOCUMENTS

| 2013/0288794 | A1  | 10/2013 | Ando et al. |
| 2015/0367240 | A1* | 12/2015 | Otomo ................. A63F 13/847 463/7 |
| 2016/0114245 | A1* | 4/2016  | Tagawa ................. A63F 13/58 463/31 |

OTHER PUBLICATIONS

International Search Report issued in PCT/JP2021/007018 on Apr. 6, 2021 (3 pages).
Written Opinion of the International Searching Authority issued in PCT/JP2021/007018 on Apr. 6, 2021 (4 pages).
Office Action issued in the counterpart Japanese Patent Application No. 2020-030095, mailed on Jul. 20, 2020 (10 pages).
Office Action issued in the counterpart Japanese Patent Application No. 2021-076264, mailed on Jul. 19, 2021 (5 pages).
Office Action issued in the counterpart Japanese Patent Application No. 2021-076264, mailed on Oct. 11, 2021 (5 pages).
"Enterbrain mook Monster Hunter Frontier G Frontier Communication G5" Kadokawa Corporation, Aug. 6, 2014, p. 63, ISBN978-4-04-729847-7 (4 pages).
Bleach Heat the Soul 4 Manual, Sony Computer Entertainment Inc., May 11, 2007, p. 4, 10-11, 14, 23, 32-33, 48-49 (20 pages).
Bleach—Heat the Soul 4—, Dengeki PSP, Aug. 3, 2007, vol. 13, No. 25, p. 88-89 (6 pages).
Azur Lane (Azuren) Squad, "Azur Lane", Duplicate Skills/Non-Duplicate Skills Summary, Game 8 [online], Jun. 15, 2018, Internet:<URL:https://game8.jp/azurlane/217604> (7 pages).
About support deck, Alfheim Demon Master [online], Oct. 10, 2017, Internet: <URL:https://web.archive.org/web/20171010095453/https://www.alfheimmonsters.com/guide/support> (17 pages).

* cited by examiner

//PROGRAM, ELECTRONIC DEVICE, METHOD, AND SYSTEM

TECHNICAL FIELD

The present invention relates to a program etc., and in particular, relates to a program etc. for a game to be executed at an electronic device that accepts a player input.

BACKGROUND ART

In recent years, electronic devices, such as smartphones, have rapidly become more widespread, and a large number of games to be executed on such portable electronic devices have been released. Among this kind of games, there are known games in which a main character and a sub-character are selected, and the sub-character is combined with the main character, thus enhancing the ability of the main character. For example, among games for playing against an enemy character, there are known games in which the ability, such as the attacking power and the power of recovery, of the sub-character is added to the ability, such as the attacking power and the power of recovery, of the main character, thereby enhancing the ability of the main character (for example, see Patent Literature 1).

CITATION LIST

Patent Literature

{Patent Literature 1} Publication of Japanese Patent No. 5938451

SUMMARY OF INVENTION

Technical Problem

Meanwhile, in a game in which a player selects a plurality of characters with which unique skills are respectively associated, and the skills of the plurality of selected characters are combined and exercised, if the skill of one of the characters is simply combined with the skill of the other character, it is impossible to exceed an expectation of the user and to obtain satisfactory fun. This combination problem arises not only in a case in which skills are associated with characters but also in a case in which skills are associated with game media, such as equipment items like weapons, selected by the player.

The present invention has been made in order to solve this problem, and an object thereof is to provide a program, an electronic device, a method, and a system that realize various combinations of skills, thus making it possible to enhance the fun of a game.

Solution to Problem

According to one aspect, the present invention provides a program for a game to be executed at an electronic device that accepts a player input, the program characterized by causing the electronic device to function as: a setting means for setting an association between a first game medium that is selected by a player and that serves as an operation target in the game and a second game medium that is selected by the player; a skip-processing-procedure deciding means for deciding, on the basis of priorities respectively associated with skill-related processing procedures of the first game medium and the second game medium, the skill-related processing procedure that becomes a skip target; and a skill-processing-procedure executing means for executing skill processing procedures respectively associated with the first game medium and the second game medium, on the basis of a player input, the program characterized in that each of the skill-related processing procedures is at least a certain processing procedure in the skill processing procedure or is the skill processing procedure, and the program characterized in that the skill-processing-procedure executing means skips the decided skill-related processing procedure when the skill processing procedures associated with the first game medium and the second game medium are executed.

According to one aspect, the present invention provides an electronic device that executes a game upon reception of a player input, the electronic device characterized by including: a setting means for setting an association between a first game medium that is selected by a player and that serves as an operation target in the game and a second game medium that is selected by the player; a skip-processing-procedure deciding means for deciding, on the basis of priorities respectively associated with skill-related processing procedures of the first game medium and the second game medium, the skill-related processing procedure that becomes a skip target; and a skill-processing-procedure executing means for executing skill processing procedures respectively associated with the first game medium and the second game medium on the basis of a player input, the electronic device characterized in that each of the skill-related processing procedures is at least a certain processing procedure in the skill processing procedure or is the skill processing procedure, and the electronic device characterized in that the skill-processing-procedure executing means skips the decided skill-related processing procedure when the skill processing procedures associated with the first game medium and the second game medium are executed.

According to one aspect, the present invention provides a method for a game to be executed at an electronic device that accepts a player input, the method characterized by including: a setting step for setting an association between a first game medium that is selected by a player and that serves as an operation target in the game and a second game medium that is selected by the player; a skip-processing-procedure deciding step for deciding, on the basis of priorities respectively associated with skill-related processing procedures of the first game medium and the second game medium, the skill-related processing procedure that becomes a skip target; and a skill-processing-procedure executing step for executing skill processing procedures respectively associated with the first game medium and the second game medium on the basis of a player input, the method characterized in that each of the skill-related processing procedures is at least a certain processing procedure in the skill processing procedure or is the skill processing procedure, and the method characterized in that, in the skill-processing-procedure executing step, the decided skill-related processing procedure is skipped when the skill processing procedures associated with the first game medium and the second game medium are executed.

According to one aspect, the present invention provides a system for a game to be executed upon reception of a player input, the system characterized by including an electronic device and a server that is connected to the electronic device via a network, the electronic device or the server functioning as a setting means for setting an association between a first game medium that is selected by a player and that serves as an operation target in the game and a second game medium that is selected by the player, the electronic device or the server functioning as a skip-processing-procedure deciding means for deciding, on the basis of priorities respectively associated with skill-related processing procedures of the first game medium and the second game medium, the skill-related processing procedure that becomes a skip target, and the electronic device or the server functioning as a skill-processing-procedure executing means for executing skill processing procedures respectively associated with the first game medium and the second game medium on the basis of a player input, the system characterized in that each of the skill-related processing procedures is at least a certain processing procedure in the skill processing procedure or is the skill processing procedure, and the system characterized in that the skill-processing-procedure executing means skips the decided skill-related processing procedure when the skill processing procedures associated with the first game medium and the second game medium are executed.

Advantageous Effects of Invention

According to the present invention, various combinations of skills are realized, thus making it possible to enhance the fun of a game.

DESCRIPTION OF EMBODIMENTS

A game system according to an embodiment of the present invention will be described below with reference to the accompanying drawings. In this specification, for convenience of description, there are cases where descriptions that are more detailed than necessary are omitted. For example, there are cases where detailed descriptions of matters that are already well known and repeated descriptions of substantially the same configurations are omitted.

Although this game system can be realized by a system in which a plurality of electronic devices are connected via a network, this game system can also be realized by one electronic device. First, a description will be given of an embodiment in which the game system is realized by one electronic device, and then, a system connected to the network will be described.

Embodiment Realized by Electronic Device

Configuration

Figure 1:
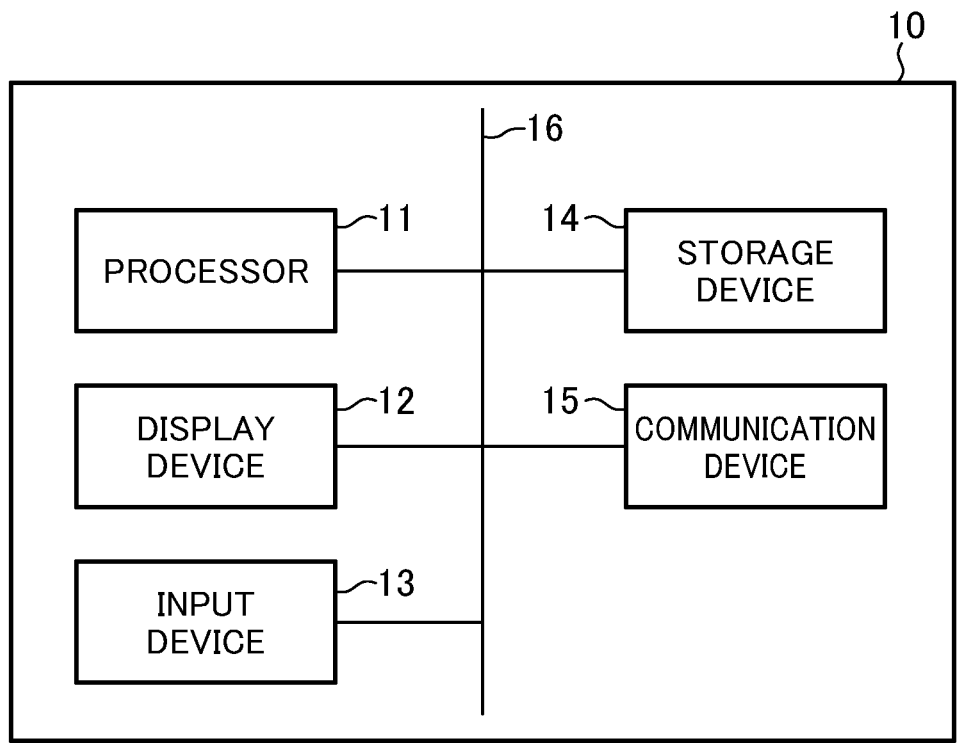
FIG. 1 is a block diagram showing a hardware configuration of an electronic device according to one embodiment of the present invention.

FIG. 1 is a block diagram showing a hardware configuration of an electronic device 10 according to one embodiment of the present invention. The electronic device 10 includes a processor 11, a display device 12, an input device 13, a storage device 14, and a communication device 15. These individual constituent devices 11 to 15 are connected via a bus 16. Note that interfaces may be interposed as needed between the bus 16 and the individual constituent devices 11 to 15. In this embodiment, the electronic device 10 is a smartphone. Alternatively, the electronic device 10 may be a terminal such as a computer equipped with a contact-type input device, like a tablet computer or a touchpad, as long as the terminal includes the configuration described above.

The processor 11 controls the overall operation of the electronic device 10 and is, for example, an electronic circuit such as a CPU or an MPU. The processor 11 executes various kinds of processing by loading programs and data stored in the storage device 14 and executing the programs. In one example, the processor 11 is constituted of a plurality of processors.

The display device 12 displays application screens etc. to a user of the electronic device 10, that is, a player, under the control of the processor 11. A liquid crystal display, an organic EL display, or a plasma display can be used as the display device 12.

The input device 13 is a user interface for accepting inputs to the electronic device 10 from the user; for example, the input device 13 is a touchscreen, a touchpad, a keyboard, or a mouse. Since the electronic device 10 of this embodiment is a smartphone, the electronic device 10 includes a touchscreen, and the touchscreen also functions as the display device 12 and as the input device 13. The display device 12 and the input device 13 may have separate forms disposed at different positions.

The storage device 14 is a storage device that includes a main memory, a buffer memory, and a storage and that is included in a general smartphone or computer, such as a magnetic storage device and a storage device that use a RAM, which is a volatile memory, and a flash memory, which is a non-volatile memory, such as an eMMC, a UFS, or an SSD. The storage device 14 may include an external memory. The storage device 14 stores, for example, a game application. The game application includes a game program for executing a game and various kinds of data to be referred to when the game program is executed. The game program is activated in accordance with an operation of the user with respect to the electronic device 10, and is executed on an operating system (OS) implemented in advance in the electronic device 10.

In one example, the storage device 14 includes a main storage device and an auxiliary storage device. The main storage device is a volatile storage medium that allows high-speed reading and writing of information, and is used as a storage area and a work area when the processor 11 processes information. The auxiliary storage device stores various programs and data that is used by the programs when the programs are executed. Although the auxiliary storage device is, for example, an SSD or a hard disk device, the auxiliary storage device may be any type of non-volatile storage or non-volatile memory that is capable of storing information and may be detachable. The auxiliary storage device stores, for example, an operating system (OS), middleware, application programs, and various kinds of data that may be referred to when these programs are executed.

The communication device 15 sends data to and receives data from other computers, such as a server, via a network. For example, the communication device 15 performs wireless communication, such as mobile communication or wireless LAN communication, to connect to the network. In one example, the electronic device 10 downloads a program from a server by means of the communication device 15 and stores the program in the storage device 14. Alternatively, the communication device 15 may perform wired communication using an Ethernet (registered trademark) cable or the like. In the case where data is not sent to or received from another computer, the electronic device 10 need not include the communication device 15.

Figure 2:
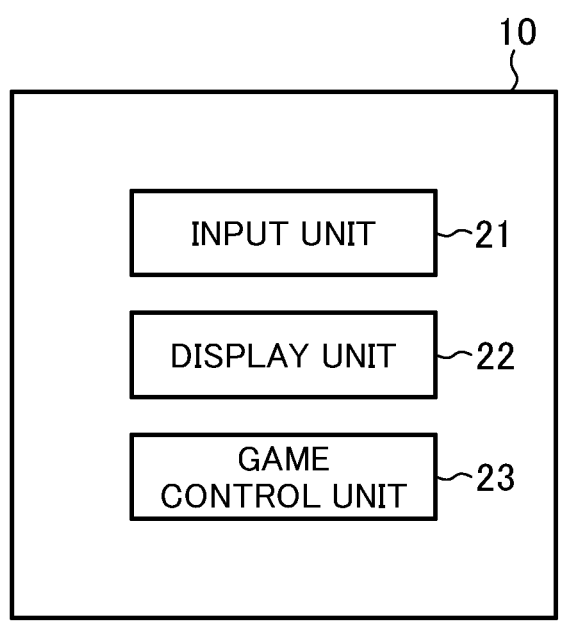
FIG. 2 is an example of a functional block diagram of the electronic device according to the embodiment of the present invention.

FIG. 2 is an example of a functional block diagram of the electronic device 10 according to the embodiment of the present invention. The electronic device 10 includes an input unit 21, a display unit 22, and a game control unit 23. In this embodiment, these functions are realized when the processor 11 executes a program. For example, the program to be executed is the game program stored in the storage device 14 or received via the communication device 15. Since the various kinds of functions are realized by loading the program, as described above, a portion or the entirety of one part (function) may be included in another part. Alternatively, these functions may be realized by means of hardware by configuring electronic circuits or the like each realizing a portion or the entirety of each of the functions.

The input unit 21 is configured by using the input device 13, and accepts inputs to the electronic device 10 from the user. In this embodiment, a touch detection function included in the touchscreen and generally provided in a smartphone can be used.

The display unit 22 is configured by using the display device 12, which displays a game field 50, and displays, on the display device 12, game screens in accordance with the proceeding of a game and user operations. The game control unit 23 performs basic control when the game of this embodiment is executed. Although the game of this embodiment is a pinball game, the game of this embodiment may be a game in which a player object, to be described later, exercises a skill or may be an action game that progresses in real time, such as a battle game.

Figure 3:
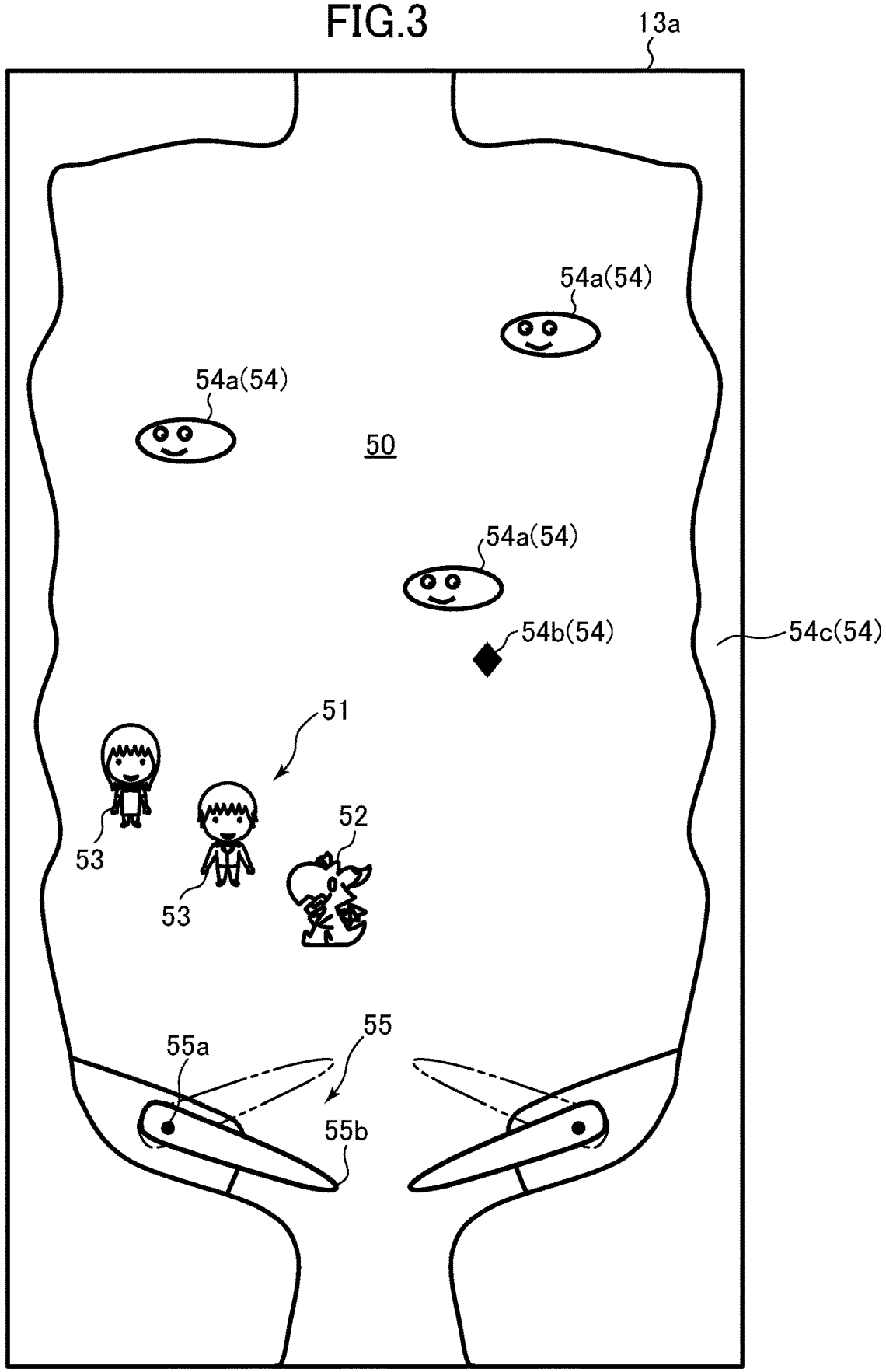
FIG. 3 is a view showing an example of a game screen.

FIG. 3 is a view showing an example of a game screen. The game control unit 23 sets the game field 50 to be displayed on the display device 12 as a virtual space used to proceed with the game. The game screen shown in FIG. 3 is a screen displayed on the whole section or a large section of a touchscreen 13a of the electronic device 10 that functions as the display device 12. In the touchscreen 13a, a position is identified by coordinates by using a coordinate plane formed by a vertical-axis direction and a horizontal-axis direction. The game control unit 23 identifies a position in the game field 50 by using the coordinates. The game control unit 23 sets the lengths of the game screen in the vertical-axis direction and the horizontal-axis direction to predetermined lengths, for example, 1920 pixels and 1080 pixels, and uses these pixel values to identify a distance or a position in the game field 50, regardless of the size or the image resolution of the touchscreen 13a. Note that identification of a position in the game field 50 is not limited to the above method, and the game control unit 23 can use a known method capable of identifying a position in the game field 50 displayed in the size corresponding to the size of the game screen on the touchscreen 13a having a different size or screen resolution.

The game control unit 23 generates the game field 50, which is configured as a virtual space surrounded by a virtual wall 54c, and disposes various objects therein in accordance with the proceeding of the game. In the game field 50 shown in FIG. 3, a party object 51, collision objects 54, and an operation object 55 are disposed.

The party object 51 is configured to include a lead object 52 that moves in the game field 50 and following objects 53 that move therein so as to follow the lead object 52. In one example, as shown in FIG. 3, the party object 51 is made up of: one lead object 52 that moves at the head thereof; one following object 53 that moves in the second place so as to follow the lead object 52; and the other following object 53 that moves in the third place so as to follow the second-place following object 53.

The individual objects 52 and 53, which make up the party object 51, are player objects corresponding to game media selected by the user (player). The game media are electronic data items, such as player characters and equipment items including weapons, items, and cards, that are selection targets to be selected by the user, and the player objects correspond to the game media and are targets that can be directly or indirectly operated by the user. In this embodiment, the game media are player characters, and the player objects corresponding to the player characters selected by the user are the lead object 52 and the following objects 53, which make up the party object 51. The number of player objects that make up the party object 51 may be one or more and is not particularly limited. For example, the party object 51 may be made up of the lead object 52 alone, and the number of following objects 53 may be one, two, three, or more. The group of characters corresponding to the player objects, which make up the party object 51, corresponds to a party in an RPG game.

In this embodiment, a game administrator or the like sets a plurality of player characters in advance and sets corresponding individual parameters and a skill for each of the player characters. The individual parameters include, for example, a level, an attacking power, a defending power, hit points (HP), a special ability (ability), etc. The special ability (ability) is an ability that can be expressed when a predetermined condition is satisfied, and is, for example, an ability to raise the attacking power by a predetermined number and to restore the HP by a predetermined number, every time a predetermined number of enemy objects 54a is defeated or an ability to raise the attacking power by a predetermined number and to raise damage to an enemy object 54a caused by the skill by a predetermined rate, when the game or a battle is started. The skill is a technique that is unique to each of the player characters and that is exercised in response to an input of the player via the input device 13.

Note that, since a player object and a player character are associated with each other, the individual parameters and the skill just need to be associated with at least either the player object or the player character. That is, the game control unit 23 may set the individual parameters and the skill for the player character, which is associated with the player object, or may set the individual parameters and the skill for the player object, which is associated with the player character. In one example, the game control unit 23 can associate the player object, the player character, the individual parameters, and the skill with one another by using a uniquely assigned ID. This method for setting the individual parameters and the skill is used similarly for another object. Furthermore, unless otherwise specifically mentioned, the individual parameters are simply referred to as parameters.

The collision objects 54 are objects with which the player objects, which make up the party object 51, can collide, and can include, for example, the enemy objects 54a, an attack object 54b, and an installed object.

The enemy objects 54a and the attack object 54b are objects that attack the player objects to cause damage thereto. The enemy objects 54a correspond to enemy characters. The attack object 54b corresponds to a flying object, such as a bullet, a beam, or an arrow, released from any of the enemy objects 54a in a predetermined direction.

The installed object is an object disposed in the game field 50 and affects the movement of each of the player objects in the game field 50 when the player object collides with the installed object. Examples of the installed object can include the wall 54c, which forms the game field 50, a block (not shown) or an obstacle (not shown) disposed in the game field 50, etc. The installed object may be disposed by being fixed at a predetermined position in the game field 50 or may move in the game field 50.

In the game of this embodiment, the game administrator or the like sets corresponding individual parameters for each of the characters etc. associated with the collision objects 54 or for each of the collision objects 54. For example, similarly for the player characters, corresponding individual parameters are set for each of the enemy characters, which are associated with the enemy objects 54a. The individual parameters include an attacking power, a defending power, hit points (HP), a special ability, etc.

The game of this embodiment includes a plurality of game fields 50 corresponding to a plurality of game stages, and the game control unit 23 can dispose, in a different manner, individual objects to be disposed in each of the game fields 50. FIG. 3 shows one example of the game field 50.

The game control unit 23 sets virtual gravity for the game field 50. The virtual gravity is obtained by reproducing a phenomenon similar to the gravity of the real world, in a virtual space. The game control unit 23 performs physics calculations using mechanical parameters including the virtual gravity and a coefficient of restitution. A known physics engine can be used for the physics calculations. The game control unit 23 sets the mechanical parameters, such as the mass, the shape, the position, the speed, and the coefficient of restitution, for each of the player objects, the collision objects 54, and the operation object 55. These mechanical parameters are parameters for the physics calculations, which are different from the individual parameters for each player character. The mechanical parameters, such as the mass, the shape, and the coefficient of restitution, are set in advance by the game administrator or the like.

The lead object 52 is an object that moves at the head of the party object 51 and that corresponds to a ball in the pinball game. Thus, the lead object 52 is an object that can move in the same way as a ball. The game control unit 23 controls the operation of the lead object 52 such that the lead object 52 moves in the game field 50 according to the virtual gravity, whereby the lead object 52 accelerates in the gravity direction under the influence of the virtual gravity. In the game field 50 shown in FIG. 3, the gravity direction is the downward direction.

The game control unit 23 controls the operations of the following objects 53 such that the following objects 53 move so as to follow the trajectory of the lead object 52 in the game field 50. Therefore, the party object 51 moves in a row as a whole. Preferably, the game control unit 23 performs control such that the following objects 53 move so as to follow the lead object 52 while keeping a constant space away from the lead object 52. Furthermore, preferably, the game control unit 23 performs control such that the following objects 53 move so as to follow the lead object 52 while also keeping a constant space between the following objects 53.

The game control unit 23 determines collisions of the lead object 52 of the party object 51 with any of the collision objects 54, which include the enemy objects 54a and the attack object 54b, and with the operation object 55. A known method can be used for the collision determination (collision detection).

In the case where the game control unit 23 determines that the lead object 52 and any of the enemy objects 54a have collided, the game control unit 23 calculates the physical quantity acting on the lead object 52 at the time of the collision, by using the mechanical parameters of the individual objects. The game control unit 23 decides the speed of the lead object 52 by using the physical quantity, which is the calculation result, and moves the lead object 52. In this way, the game control unit 23 performs physics calculations related to a bounce motion of the lead object 52 at the time of collision. The game control unit 23 performs the same calculations when the lead object 52 collides with the operation object 55 or the installed object, such as the virtual wall 54c.

In the case where the game control unit 23 determines that the lead object 52 and any of the enemy objects 54a have collided, the game control unit 23 changes the individual parameters set for the enemy object 54a that is determined to have collided, on the basis of the individual parameters set for the lead object 52.

In one example, in the case where the game control unit 23 determines that the lead object 52 and the enemy object 54a have collided, the game control unit 23 determines that the player character associated with the lead object 52 has caused damage to the enemy character associated with the enemy object 54a. At this time, the game control unit 23 calculates a damage amount from the individual parameters, such as the attacking power, set for the player character associated with the lead object 52. Then, the game control unit 23 uses the calculated damage amount to reduce the HP, for example, of the enemy character associated with the enemy object 54a that is determined to have collided, thus changing the individual parameters for this enemy character.

The collision objects 54, which include the enemy objects 54a, are set as objects that are not affected by the virtual gravity, whereby the game control unit 23 can continuously dispose the enemy objects 54a at positions where the game quality becomes higher. In one example, each of the enemy objects 54a (the enemy characters) emits the attack object 54b, and, when any of the player objects of the party object 51 collides with the attack object 54b, the game control unit 23 determines that the collided player object has been damaged. At this time, the game control unit 23 reduces the HP, for example, of the player character associated with the player object, thus changing the parameters for this player character. However, the collision objects 54 may also be set as objects that are not affected by the virtual gravity.

The operation object 55 is an object operated by the user and is a hitting object corresponding to a flipper in the pinball game. As shown in FIG. 3, the operation object 55 is formed of a pair of hitting objects. The pair of hitting objects each swivel about one end section 55*a* located at an outer side so as to displace the other end section 55*b* up and down, at a predetermined angle or for a predetermined distance.

In one example, when the game control unit 23 determines that the lead object 52 and the operation object 55 have collided, the game control unit 23 performs physics calculations related to a bounce motion of the lead object 52 at the time of the collision and decides the speed of the lead object 52 by using the physics calculation result. Preferably, the game control unit 23 corrects an angle and a force applied to the lead object 52 from the operation object 55, in view of the operability of the user. Note that the operation object 55 may be formed of one hitting object or three or more hitting objects.

The game control unit 23 operates the operation object 55 on the basis of a touch of the user detected by the touchscreen 13*a* of the electronic device 10. Specifically, when the touchscreen 13*a* accepts a touch, the game control unit 23 displaces the other end section 55*b* of each of the hitting objects to a predetermined position higher than the position thereof placed when the touchscreen 13*a* does not detect a touch. The game control unit 23 maintains the other end section 55*b* of the hitting object at the predetermined position while the touchscreen 13*a* accepts the touch. In one example, the game control unit 23 can perform similar processing when accepting touches at all positions that can be detected by the touchscreen 13*a*. Although the operation object 55 collides with the player object in the same way as the collision objects 54, the operation object 55 differs from the collision objects 54 in that the operation object 55 is operated by an input of the user.

In the game of this embodiment, the player exercises a skill, thereby making it possible to generate a special effect. It is assumed that a skill is associated with each player character, and every player character has only one skill. Examples of skills include: a skill of causing great damage to an enemy character; a skill of generating an effect, e.g., of restoring the HP of the player character; etc. When a skill gauge that is accumulated at a predetermined speed has accumulated up to the maximum, for example, the skill can be exercised by consuming all of the skill gauge.

In one example, the skill can be exercised through a swipe input. The swipe input is an operation input performed by bringing a finger or the like of the player into contact with the touchscreen 13*a* of the electronic device 10, moving the finger or the like while maintaining contact, and then releasing the finger or the like from the touchscreen 13*a*, and includes slide and flick operations. In one example, a swipe direction in which the skill is exercised can be set in different directions for the respective player characters corresponding to the player objects, which make up the party object 51. For example, the skill of the lead object 52 can be exercised through a swipe input in the left direction, the skill of the following object 53 that is in the second place next to the lead object can be exercised through a swipe input in the upward direction, and the skill of the following object 53 that is in the third place can be exercised through a swipe input in the right direction, on condition that the skill gauge has accumulated to the maximum. The game control unit 23 of this embodiment executes skill processing procedures associated with player objects on the basis of a player input, such as a swipe input, thereby making it possible to exercise the skills of the player objects.

Figure 4:
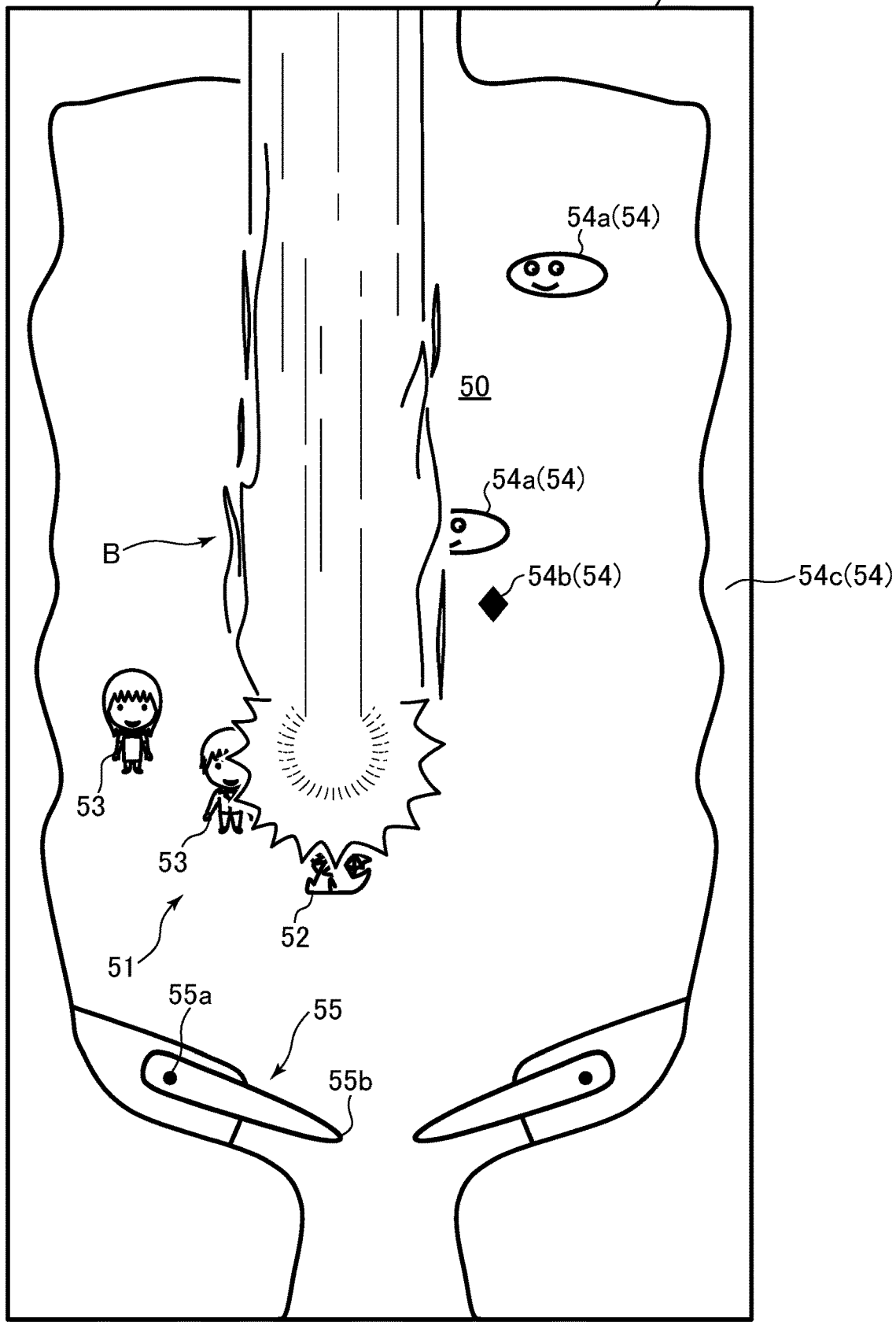
FIG. 4 is a view showing an example of the game screen and shows a skill of stopping a player character corresponding to a lead object for a predetermined period of time at a position in a game field at the time of the exercise of the skill and of emitting a beam upward to cause damage to an enemy object.

A great variety of skills are set in advance for the individual player characters. Examples of skills are: a skill of stopping for a predetermined period of time at a position in the game field 50 at the time of the exercise of the skill and of emitting a beam upward to cause damage to any of the enemy objects 54*a*; a skill of moving for a predetermined period of time or in a predetermined direction (for example, the right direction) by a predetermined number of pixels to cause damage to any of the enemy objects 54*a* with which the player character collides; a skill of moving according to the virtual gravity to cause damage, by an attack aura placed around the player character itself, to the enemy object(s) 54*a* located within the range of the attack aura; and a skill of releasing an arrow to cause damage to any of the enemy objects 54*a* hit by the arrow and of restoring the HPs of all the player characters corresponding to the player objects, which make up the party object 51, by a predetermined number every time the arrow is released. FIG. 4 shows a skill of stopping the player character corresponding to the lead object 52 for a predetermined period of time at a position in the game field 50 at the time of the exercise of the skill and of emitting a beam B upward to cause damage to the enemy object(s) 54*a*.

The skill processing procedure is a series of processing procedures for executing a skill associated with the player character, and can include a certain processing procedure with which a priority is associated and another processing procedure with which a priority is not associated. The certain processing procedure with which a priority is associated can include at least one of a movement processing procedure, a skill-production displaying processing procedure, and a skill-effect processing procedure.

In one example, the skill processing procedure is a series of processing procedures that are designed by a game developer such that one or more of an arbitrary movement processing procedure, a skill-production displaying processing procedure, and a skill-effect processing procedure are included and combined in an arbitrary order. For example, the skill processing procedure is designed such that the certain processing procedure with which a priority is associated and the other processing procedure with which a priority is not associated can be included in individual processing frames in an arbitrary order. In one example, the skill processing procedure is a series of processing procedures in which the processing procedure(s) defined in each processing frame is/are arranged in series on a processing-frame basis; for example, the movement processing procedure, the skill-production displaying processing procedure, and the skill-effect processing procedure are sequentially performed in a first processing frame, the skill-production displaying processing procedure and the movement processing procedure are sequentially performed in a second processing frame, and only the movement processing procedure is performed in a third processing frame. It is just necessary to include at least one of the certain processing procedure with which a priority is associated and the other processing procedure with which a priority is not associated, in each processing frame, and to include at least one certain processing procedure with which a priority is associated, in any of the processing frames as the whole skill processing procedure. Note that a processing frame is a time unit from when one image is displayed on the display device 12 as a game screen to when the next image is displayed thereon as a game screen.

The movement processing procedure is a processing procedure for moving the player object of which the skill is exercised and which makes up the party object 51, in the game field 50 according to a movement mode included in the skill of the player character corresponding to this player object. Examples of movement modes include "move", "stop", and "none". The individual groups of movement modes, such as "move", "stop", and "none", can each include a plurality of types of movement. For example, "move" includes movement in the game field 50 in the left direction by a predetermined number of pixels, movement in the right direction by a predetermined number of pixels, movement toward the enemy objects 54*a*, etc., and "stop" includes a mode of stopping in the game field 50 for several seconds (for example, two seconds or three seconds), etc. Furthermore, "none" includes a mode of stopping in the game field 50 for a period of time shorter than in "stop", a mode of falling according to the virtual gravity, etc.

In one example, the priority order can be set based on usefulness. For example, the priority is assigned to the groups of the movement modes and is set to "move", "stop", and "none" in descending order. This is because the game develops in more various ways when the movement of the player object is actively controlled, thus making it possible to improve the game quality. However, the priority order is not limited to this, and the priority may also be set individually in accordance with the skill of the player character. For example, a higher priority may be set for the group "stop" or "none" than the group "move". This is because, in the case where the skill is, for example, placing an attack aura around the player object to cause damage to the enemy object(s) 54*a* located within the range of the attack aura, when the player object comes close to the enemy object(s) 54*a*, the skill is exercised, and the player object is stopped for a predetermined period of time so as to be able to keep causing damage to the enemy object(s) 54*a*, and the player object can be stopped at a position where the player object can avoid attack from the attack object(s) 54*b*, whereby there are more useful cases than a case in which the player object is moved. The priority order can be appropriately changed by the game administrator or the like according to the request of the user.

The skill-production displaying processing procedure is a processing procedure for displaying a production of the skill on the display device 12. Productions of the skill of the skill-production displaying processing procedure can include, for example, a production in which a beam is emitted in a predetermined direction, a production in which an aura for causing damage to the enemy object(s) 54*a* is placed around the player object in a predetermined range, a production in which an arrow is released in a predetermined direction, etc.

The skill-effect processing procedure can include processing for changing the individual parameters, which is involved in skill effects, such as an increase in attacking power by a predetermined amount and restoration of the HP by a predetermined amount while the skill is being exercised. This processing for changing the individual parameters may be performed not only on the player object of which the skill is exercised but also on the other player objects.

The other processing procedure which is not associated with a priority includes a collision determination processing procedure. The collision determination processing procedure is a processing procedure for determining whether a first player object has collided with any of the enemy objects 54*a* or the attack object 54*b* and/or whether the skill (for example, a beam or an arrow) has hit any of the enemy objects 54*a*. After this processing procedure, a damage amount obtained by the collision and/or hit can be calculated in the skill-effect processing procedure.

Examples of priorities can include a movement priority that is related to movement in the game field 50, a skill-production priority that is related to display of a production at the time of the exercise of the skill, a skill-effect priority that is related to an effect time during which the skill is expressed at the time of the exercise of the skill, etc. Priorities are assigned to the same kind of certain processing procedures included in the skill processing procedures. For example, the same priority ID is assigned to the same kind of certain processing procedures, and the priorities of certain processing procedures to which the same priority ID is assigned can be compared to each other to decide which is prioritized. In one example, priorities and the same priority ID are assigned to the movement processing procedure included in the skill processing procedure of a first player character and the movement processing procedure included in the skill processing procedure of a second player character. In one example, priorities are expressed by numerical values. Accordingly, a certain processing procedure included in the skill processing procedure of the first player character and a certain processing procedure included in that of the second player character can be compared with each other. Priority IDs are respectively assigned to different kinds of certain processing procedures in such a manner that the kinds thereof can be identified, and the priority IDs can be, for example, numerical values or letters in alphabet etc.

The priority may be associated with at least a certain processing procedure included in the skill processing procedure, as described above, or may be associated with the skill processing procedure itself. In one example, since the skill processing procedure is associated with each of the player characters, the priority may also be associated with the player character (that is, the game medium). Accordingly, the priority and the skill processing procedure itself are associated with each other. In this embodiment, unless otherwise specially noted, the priority is associated with at least a certain processing procedure in the skill processing procedure.

Figure 5:
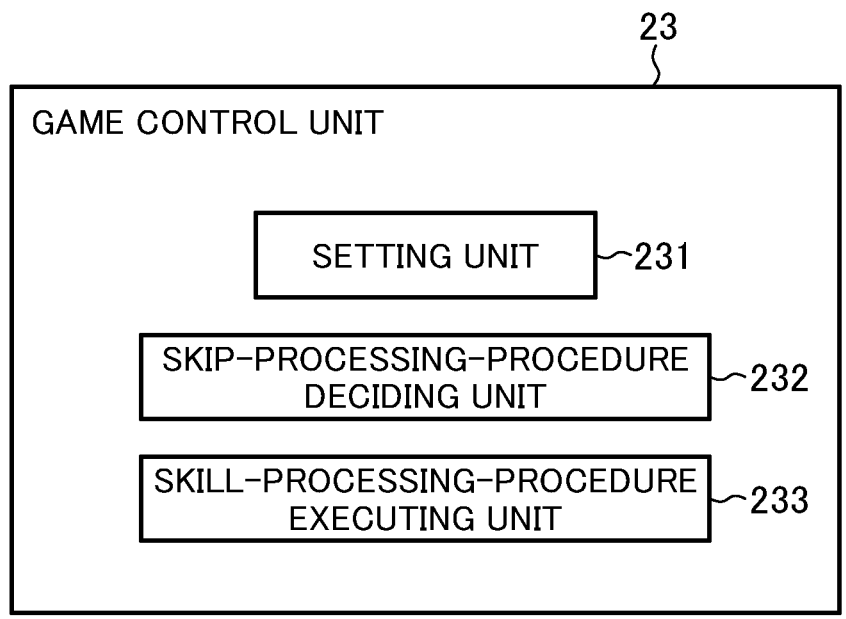
FIG. 5 is an example of a functional block diagram of a game control unit.

FIG. 5 shows an example of a functional block diagram of the game control unit. The game control unit 23 includes a setting unit 231, a skip-processing-procedure deciding unit 232, and a skill-processing-procedure executing unit 233.

The setting unit 231 is configured to include the processor 11 and sets an association between a first player character and a second player character selected by the player. In one example, the setting unit 231 accepts selection of the first player character and the second player character performed by the player, via the input unit 21 (input device 13), and stores the association between the selected first player character and the selected second player character in the storage device 14, thereby setting the association between the first player character and the second player character. For example, IDs respectively associated with the first player character and the second player character are associated with each other and are stored in the storage device 14, whereby the association therebetween is set.

In this embodiment, player characters are selected by the player such that the first player character is selected from a common player-character group set in advance, and the second player character is selected from among the rest in this one common player-character group. This is because the number of combinations of player characters can be increased compared with the case in which the first player character is selected from a character group for the first player character, and the second player character is selected from a character group for the second player character, the character groups being set in advance, whereby it is possible to enable various types of organization and to improve the game quality. Note that the selection order may be the opposite, that is, it is also possible to select the second player character first and then to select the first player character from among the rest. Instead of the above-described selection method, it is possible to select the first player character from the character group for the first player character and the second player character from the character group for the second player character.

Although the first player character and the second player character may be in an equal relationship, the setting unit 231 of this embodiment sets a master-servant relationship therebetween. That is, the first player character is set as a main character, and the second player character is set as an assistant character for assisting the first player character. The first player character is selected, thus deciding the main character, and the second player character is selected, thus deciding the assistant character for assisting the main character. As in the above-described case, the selection order may be the opposite, and it is also possible to decide the assistant character first and then to decide the main character.

In the case where the first player character and the second player character are in a master-servant relationship, the assistant character can be considered as an equipment item for the main character to assist the main character. Since the assistant character is equipped on (in unison with) the main character, the assistant character is also referred to as a unison character. In an assistant mode, for example, the assistant character itself also has an attacking power, HP, a skill, and an ability, whereby it is possible to add the attacking power, the HP, the skill, and the ability of the assistant character to the attacking power including at least the skill, the HP, the skill, and the ability of the main character.

In one example, with a swipe in a predetermined direction being used as a trigger, the skill of the main character and the skill of the assistant character, which is associated with the main character, are exercised (typically, at the same time). In one example, the skill-production displaying processing procedure and the skill-effect processing procedure included in the skill processing procedure of the main character and the skill-production displaying processing procedure and the skill-effect processing procedure included in the skill processing procedure of the assistant character are executed in parallel (typically, at the same time). Furthermore, the collision determination processing procedure may be executed as needed. For example, a skill production of the main character (for example, placing an attack aura) and a skill production of the assistant character (releasing an arrow toward the surroundings) are overlaid and displayed on the display device 12, and the skill-effect processing procedures for causing a predetermined amount of damage to the enemy object(s) 54a if the enemy object(s) 54a is/are located within the range of the attack aura and for causing a predetermined amount of damage to any of the enemy objects 54a if it is determined that the arrow has hit the enemy object 54a are executed.

Furthermore, it is also possible to add a portion of the attacking power or the HP of the assistant character to the attacking power or the HP of the main character. In one example, 25% of the attacking power or the HP of the assistant character may be added to the attacking power or the HP of the main character, and the resultant may be set as the attacking power or the HP of the main character. The ability of the assistant character may also be treated as the ability of the main character. Note that experience points that can be obtained when the main character, for which the association has been set, clears the game can also be obtained not only by the main character but also by the assistant character. Accordingly, an association is set by selecting, as an assistant character, a character that the player wishes to raise, thereby enabling raising of the character and enabling various types of organization, whereby the game strategy can be increased.

In this embodiment, with the setting of a master-servant relationship, the game control unit 23 displays, in the game field 50, the player object corresponding to the main character and does not display an assistant object corresponding to the assistant character. That is, the assistant object is a hidden target. However, the assistant object may also be displayed in the game field 50, or a first player object and a second player object may both be displayed in the case where the first player object and the second player object are not in a master-servant relationship but are in a flat relationship. Note that the lead object 52 and the following objects 53 are player objects corresponding to main characters and are not assistant objects.

The setting unit 231 can set, for each of the plurality of player objects, an association between a first player character and a second player character. In the example shown in FIG. 3, since there are three player objects that make up the party object 51, the setting unit 231 sets an association between a main character corresponding to the lead object 52 and an assistant character for assisting this main character, an association between a main character corresponding to the second-place following object 53 and an assistant character for assisting this main character, and an association between a main character corresponding to the third-place following object 53 and an assistant character for assisting this main character. Therefore, in this case, six characters are selected from the one common character group.

The skip-processing-procedure deciding unit 232 is configured to include the processor 11 and decides, on the basis of the priorities respectively associated with skill-related processing procedures of the first player character and the second player character, the skill-related processing procedure that becomes a skip target. In this embodiment, since the skill-related processing procedure is a certain processing procedure included in the skill processing procedure, the skip-processing-procedure deciding unit 232 in this embodiment decides, on the basis of the priorities respectively associated with at least certain processing procedures in the skill processing procedures respectively associated with the first player character and the second player character, the certain processing procedure that becomes a skip target. For example, the skip-processing-procedure deciding unit 232 performs comparison determination between the priorities, decides the certain processing procedure, associated with the priority, of the second player character as a skip target in the case where the priority of the first player character is higher, and decides the certain processing procedure, associated with the priority, of the first player character as a skip target in the case where the priority of the second player character is higher.

Table 1 shows an example of settings of the contents and the priorities of individual processing procedures defined in one processing frame and included in the skill processing procedures of the respective player characters for which an association has been set at the setting unit 231.

TABLE 1

| Kinds of content of skill processing procedure | Content of skill processing procedure of first player character | Priority | Content of skill processing procedure of second player character | Priority |
|---|---|---|---|---|
| Skill-production displaying processing procedure | Beam emission production | N/A | Production for making direction of travel of player character shine | N/A |
| skill-effect processing procedure | Cause damage of 10 to enemy that has been hit by beam | N/A | Cause damage of 5 to collided enemy | N/A |
| movement processing procedure | Stop for 3 seconds | 1 | Move for 3 seconds in right direction | 3 |

In one example, as shown in Table 1, priorities are not set for the skill-production displaying processing procedures and the skill-effect processing procedures of the first player character and the second player character, and priorities are set for the movement processing procedures thereof such that the priority of the second player character becomes higher. The skip-processing-procedure deciding unit 232 reads, from the storage device 14, the settings of the priorities included in the association, which has been set at the setting unit 231, and performs priority comparison determination on the movement processing procedures for which the priorities have been set. In the case of Table 1, the skip-processing-procedure deciding unit 232 determines that the priority of the movement processing procedure of the second player character is higher because the priority of the movement processing procedure of the second player character has a larger value, and decides the movement processing procedure of the first player character as a skip target.

Furthermore, in the case where the priorities respectively associated with the certain processing procedures in the skill processing procedures of the first player character (for example, the main character) and the second player character (for example, the assistant character) are equal to each other, the skip-processing-procedure deciding unit 232 decides the certain processing procedure of the second player character as a skip target. It is also possible to decide the certain processing procedure of the first player character as a skip target, instead of deciding the certain processing procedure of the second player character as a skip target.

The certain processing procedure that becomes a skip target just needs to be decided before the skill processing procedures are executed. For example, decision of a skip target may be performed when the setting unit 231 sets an association between the first player character and the second player character, may be performed with an input of the player for exercising the skills, or may be performed after the setting unit 231 sets an association therebetween and before an input of the player for exercising the skills.

The above-described decision of a skip target by the skip-processing-procedure deciding unit 232 can be performed on a processing-frame basis. In one example, the skip-processing-procedure deciding unit 232 compares, in each processing frame, the priority ID associated with a certain processing procedure included in the skill processing procedure of the first player character with the priority ID associated with a certain processing procedure included in the skill processing procedure of the second player character, to identify the certain processing procedures of the same kind. Then, the skip-processing-procedure deciding unit 232 compares the priorities associated with these certain processing procedures and decides the certain processing procedure that has a lower priority, as a skip target.

The skill-processing-procedure executing unit 233 is configured to include the processor 11 and executes the skill processing procedures respectively associated with the first player character and the second player character, on the basis of a player input. In one example, the skill processing procedures of the first player character and the second player character are executed in parallel, each serving as a series of processing procedures, on the basis of one player input (for example, swipe input) for exercising the skills. At this time, the certain processing procedure that has a lower priority is skipped. That is, the certain processing procedure that has a lower priority is not executed by being skipped or is ignored by being rewritten to an instruction to do nothing. The skill processing procedures of the individual player characters may also be started at the same time with a player input.

In one example, the skill-processing-procedure executing unit 233 sequentially executes, in each processing frame, processing procedures that are included in the skill processing procedures of the individual player characters and that are defined in the processing frame. In the example shown in Table 1, in one processing frame, the skill-processing-procedure executing unit 233 executes in parallel the skill-production displaying processing procedure of the first player character and the skill-production displaying processing procedure of the second player character, then executes in parallel the skill-effect processing procedure of the first player character and the skill-effect processing procedure of the second player character, and then executes the movement processing procedure of the second player character as movement of the first player object while skipping the movement processing procedure of the first player character. Although the order of processing procedures in the skill processing procedures in a processing frame has been described in order of the skill-production displaying processing procedures, the skill-effect processing procedures, and the movement processing procedures, the order of processing procedures is not limited thereto and can be set as appropriate as long as no inconsistency arises in the operation, and the content of each of the processing procedures can also be set as appropriate.

Note that, regarding the execution of the skill processing procedures, the skill processing procedures themselves of the first player character and the second player character may also be executed in series, or at least any of the skill-production displaying processing procedure, the skill-effect processing procedure, and the movement processing procedure in each of the skill processing procedures may also be executed in series in the first player character and the second player character. For example, it is possible that, after the whole skill processing procedure of the first player character is executed, the whole skill processing procedure of the second player character is executed. Alternatively, it is also possible to execute a portion of the skill processing procedure of the first player character in a first processing frame and to execute a portion of the skill processing procedure of the second player character in a second processing frame, or it is also possible to execute a portion (for example, at least any of the skill-production displaying processing procedure, the skill-effect processing procedure, and the movement processing procedure) of the skill processing procedure of the first player character and then to execute a portion (for example, at least any of the skill-production displaying processing procedure, the skill-effect processing procedure, and the movement processing procedure) of the skill processing procedure of the second player character, in the same processing frame. Alternatively, a portion of the skill processing procedure of the first player character and a portion of the skill processing procedure of the second player character may be sequentially executed in an alternating manner, as in the case where the skill-production displaying processing procedure of the first player character is executed, the skill-production displaying processing procedure of the second player character is then executed, and the movement processing procedure of the first player character is next executed, in the same processing frame. In this way, for each processing frame or in each processing frame, a portion of the skill processing procedure of the first player character and a portion of the skill processing procedure of the second player character may be executed in series in an arbitrary order.

In the case where the skip-processing-procedure deciding unit 232 determines that the movement priority of the second player object is lower than that of the first player object, the skill-processing-procedure executing unit 233 skips the movement processing procedure of the second player object and executes the movement processing procedure of the first player object.

In the case where the skip-processing-procedure deciding unit 232 determines that the movement priority of the first player object is lower than that of the second player object, the skill-processing-procedure executing unit 233 skips the movement processing procedure of the first player object and executes the movement processing procedure of the second player object as movement of the first player object in the game field 50.

Figure 6:
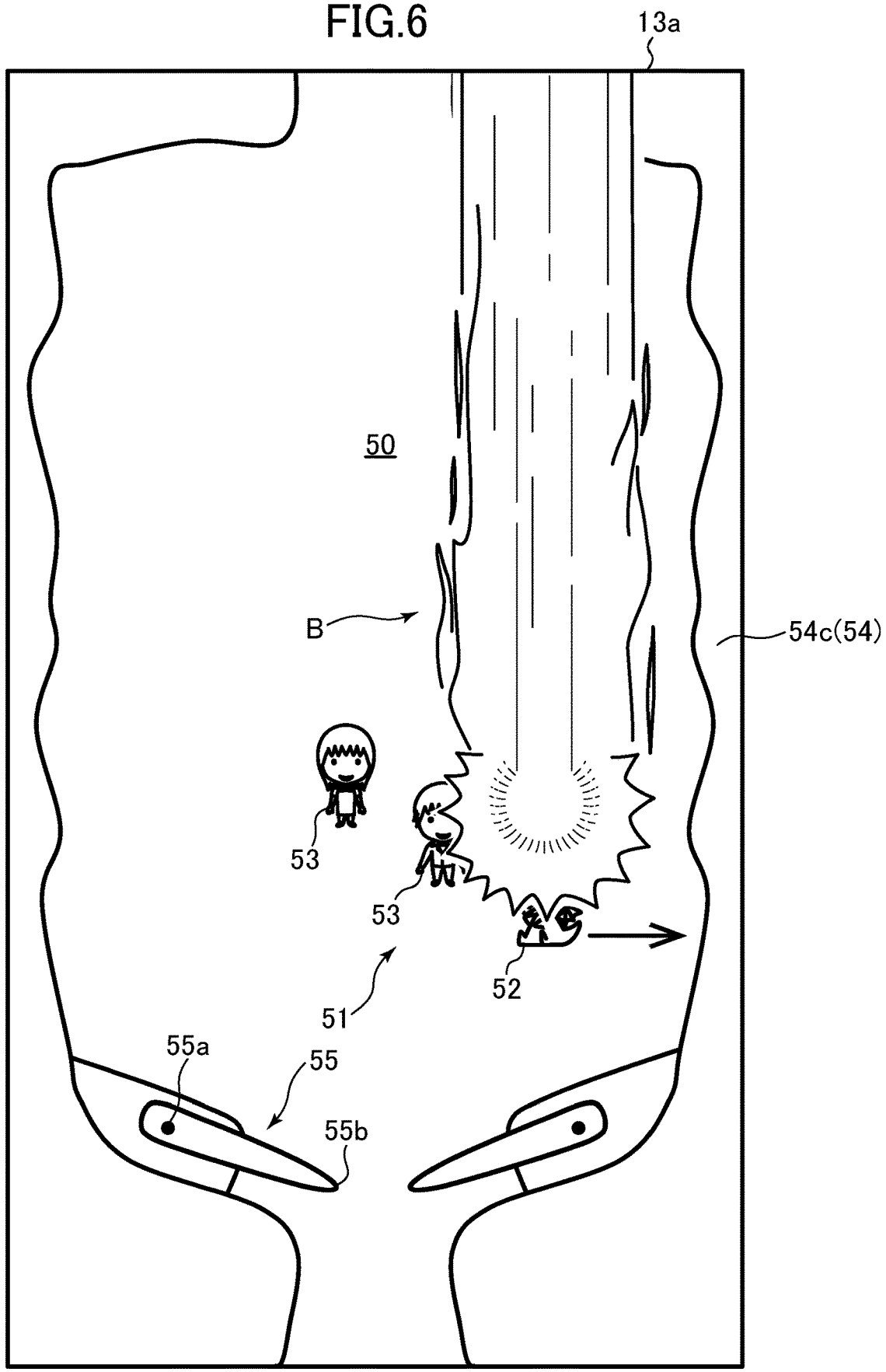
FIG. 6 is a view showing an example of the game screen and showing a state in which skills of a main character that corresponds to the lead object and an assistant character are exercised while the lead object is being moved through a movement processing procedure having a higher movement priority.

For example, in the case where the skill of the main character corresponding to the lead object 52 shown in FIG. 4 is a skill of stopping for a predetermined period of time at a position in the game field 50 at the time of the exercise of the skill and of emitting the beam B upward to cause damage to the enemy object(s) 54a, like the skill of the first player character shown in Table 1, and the skill of the assistant character associated with this main character is a skill of moving in the right direction for a predetermined period of time to cause damage to the enemy object(s) 54a with which the assistant character has collided, like the skill of the second player character shown in Table 1, and in the case where the movement priority of the movement processing procedure of the assistant character for moving in the right direction for the predetermined period of time is set higher than the movement priority of the movement processing procedure of the main character for stopping for the predetermined period of time, the skill-processing-procedure executing unit 233 skips the movement processing procedure of the main character, which is decided as a skip target by the skip-processing-procedure deciding unit 232, and executes the movement processing procedure of the assistant character as movement of the lead object 52. Therefore, as shown in FIG. 6, the skill of the main character is exercised, whereby the lead object 52 moves in the right direction for the predetermined period of time while emitting the beam B upward, thus making it possible to cause damage to the enemy objects 54a in a wider range than a case where the lead object 52 stops for the predetermined period of time and emits the beam B. In this way, since the first player character is equipped with the second player character, it is possible to exercise the skills as a skill that exceeds the skills of the individual player characters just expressed in parallel.

Operation

Figure 7:
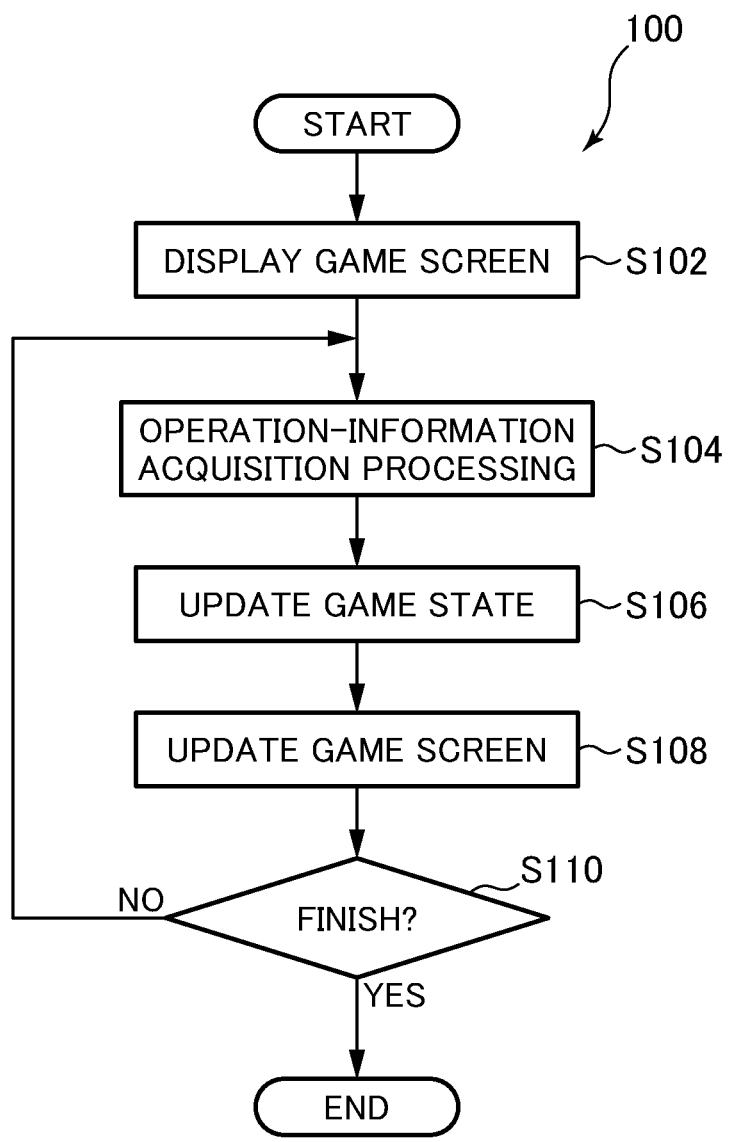
FIG. 7 is an example of a flowchart of main processing executed at the electronic device according to the embodiment of the present invention.

Main processing 100 to be executed at the electronic device 10 according to the embodiment of the present invention will be described below with reference to FIG. 7. Note that a smartphone is used as the electronic device 10 in this embodiment, and a frame rate of 30 fps, 60 fps, or the like is generally set in the smartphone. The electronic device 10 executes the processing at regular intervals, preferably, in accordance with the frame rate.

When the game is started, the electronic device 10 displays a game screen including the game field 50, as shown in FIG. 3 (S102). Next, the electronic device 10 executes operation-information acquisition processing for obtaining information about a touch input performed by the player with respect to the touchscreen 13a, which functions as the input unit 21 (S104). The game control unit 23 further executes skill-related processing 200, to be described later, continuously in parallel with the main processing 100 until the game is ended. The skill-related processing 200 is executed on the basis of the operation information obtained in the main processing 100.

Next, the electronic device 10 updates a game state (S106). The game state includes the mechanical parameters and the individual parameters of various objects and information related to collision determination and the game field 50. For example, the electronic device 10 updates the mechanical parameters of the various objects from the mechanical parameters thereof in the previous frame, the elapsed time from the previous frame, the virtual gravity, and the collision determination result in the previous frame, thereby updating the positions and the speeds of the various objects. For example, the elapsed time is calculated from the frame rate and the number of elapsed frames.

The electronic device 10 performs collision determination from the updated mechanical parameters of the various objects. Furthermore, the electronic device 10 updates the individual parameters of the various objects from the collision determination result in the current frame, skills that have been exercised, and the individual parameters in the previous frame. Regarding collision determination, it will be understood by a person skilled in the art that whether the lead object 52 and any of the enemy objects 54a or the attack object 54b have collided with each other can be determined by various methods by using the mechanical parameters of the lead object 52 and the enemy object 54a or the attack object 54b.

Next, the electronic device 10 draws a game screen on the basis of the updated game state, thereby updating the game screen (S108). For example, the electronic device 10 fixes the positions and the states of the various objects from the updated mechanical parameters and individual parameters of the various objects and draws a game screen, thereby displaying the updated game screen on the display device 12. For example, when the HP in the updated individual parameters of any of the enemy objects 54a is zero, this enemy object 54a disappears from the game field 50 included in the updated game screen.

As long as the game is not ended in S108, the flow of this processing returns to S104. This processing can be executed in parallel with other processing, such as the collision determination processing procedure, the skill-related processing 200, etc., while being synchronized with the other processing, as needed.

Note that the processing steps in the respective steps in this flowchart are just examples, and it is also possible to change the order of the processing steps in the respective steps or to execute other processing steps in addition to or instead of the processing steps in the respective steps, as long as the same advantageous effects can be obtained. For example, the order of the processing steps in S102 to S108 can be changed.

Figure 8:
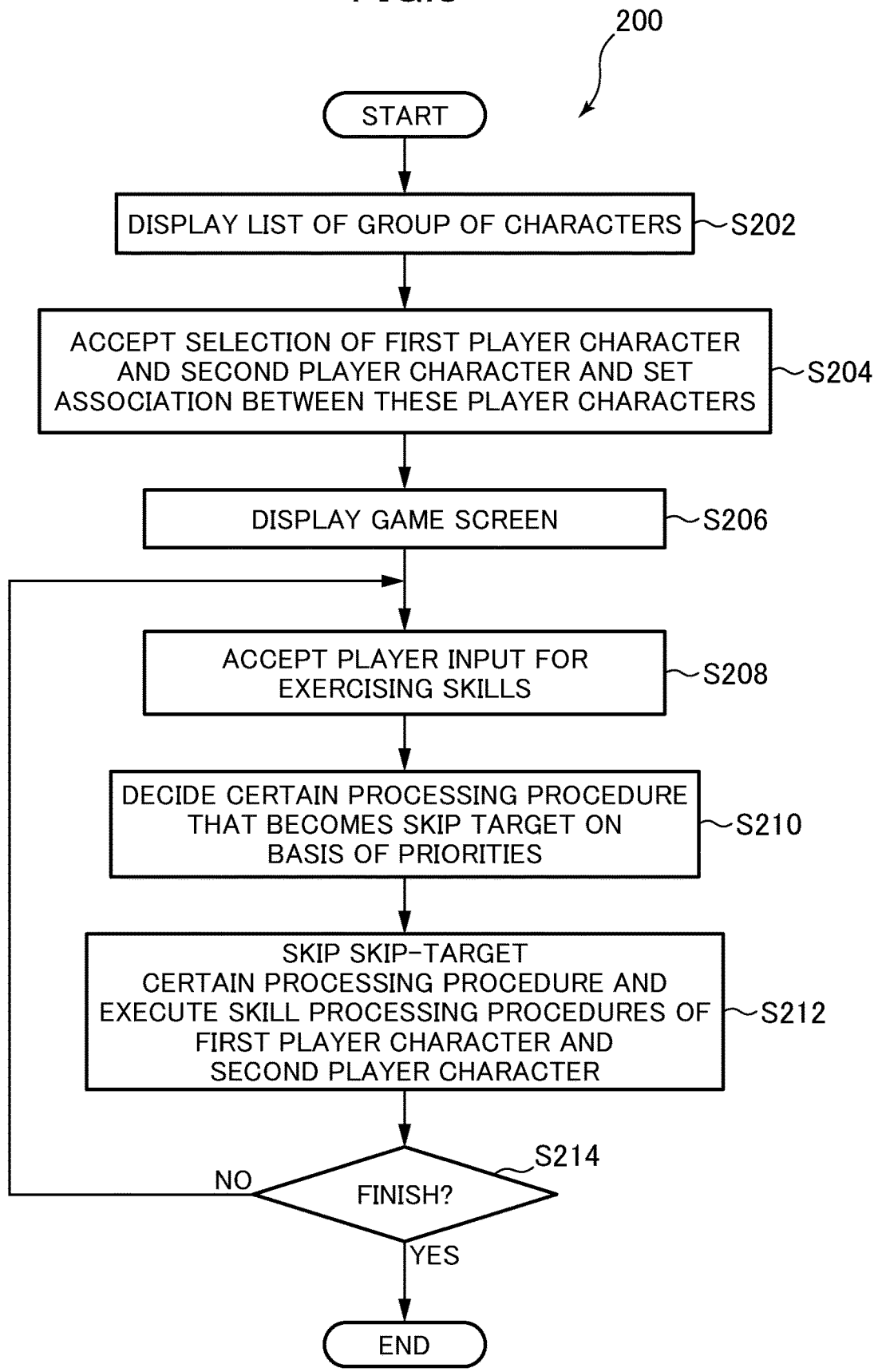
FIG. 8 is an example of a flowchart of skill-related processing executed at the electronic device according to the embodiment of the present invention.

The skill-related processing 200 executed at the electronic device 10 according to the embodiment of the present invention will be described below with reference to FIG. 8.

First, the electronic device 10 displays a list of a group of characters that is set in advance, on the display device 12 (S202). Specifically, the group of characters is read from the storage device 14 by the game control unit 23 and is displayed as a list on the display device 12.

Next, selection of the first player character and the second player character from the list performed by the player is accepted via the input device 13 (for example, the touchscreen 13a of the electronic device 10), and an association between these player characters is set (S204).

After this setting, the game is started, and the game screen including the game field 50 is displayed (S206). S206 corresponds to S102. After S206, a player's input for exercising the skills is accepted on condition that the skill gauge has become the maximum (S208). In one example, this input is a swipe with a finger or the like of the player performed on the touchscreen 13a of the electronic device 10.

With the player's input in S208, a certain processing procedure that becomes a skip target is decided on the basis of the priorities respectively associated with the certain processing procedures included in the skill processing procedures associated with the individual player characters set in S204 (S210). In one example, the game control unit 23 identifies the first player character and the second player character of which the skills are exercised, on the basis of a swipe direction, and the skip-processing-procedure deciding unit 232 compares the movement priorities of these player characters. In the case where the movement priority of the first player character is higher, the movement processing procedure included in the skill processing procedure of the second player character is decided as a skip target. On the other hand, in the case where the movement priority of the second player character is higher, the movement processing procedure included in the skill processing procedure of the first player character is decided as a skip target. In this case, the skip-processing-procedure deciding unit 232 decides the movement processing procedure included in the skill processing procedure of the second player character, as movement of the first player object in the game field 50.

After S210, the skill-processing-procedure executing unit 233 executes the skill processing procedures associated with the first player character and the second player character (S212). In one example, the skill processing procedures are executed in parallel on the basis of one player input in S208. For example, the skill-processing-procedure executing unit 233 starts the skill processing procedures at the same time with one player input in S208.

In the execution of the skill processing procedures in S212, the certain processing procedure that has been decided in S210 is skipped. For example, if it is assumed that the priorities are assigned to only the movement processing procedures, the movement processing procedure that has a lower priority is skipped, the movement processing procedure that has a higher priority is executed as movement of the first player object, and the skill-production displaying processing procedure, the skill-effect processing procedure, and the collision determination processing procedure of the first player character and the skill-production displaying processing procedure and the skill-effect processing procedure of the second player character are respectively executed in parallel.

The processing steps in the respective steps of this flowchart are just examples, and it is also possible to change the order of the processing steps in the respective steps or to execute other processing steps in addition to or instead of the processing steps in the respective steps, as long as the same advantageous effects can be obtained. For example, in the above-described flowchart, although a skip target is decided with a player input for exercising the skills, a skip target may be decided when the association between the first player character and the second player character is set or before a player input for exercising the skills is accepted.

Modification

In this embodiment, although a description has been given of a mode in which the main character and the assistant character are selected from a group of player characters and are associated with each other, and the skill processing procedures corresponding to the individual characters are executed, targets to be selected are not limited to player characters and can be game media, such as weapons or other equipment items, with which skills are respectively associated. For example, it is possible to set an association between a first weapon and a second weapon that are selected from one weapon group by the player, to decide a certain processing procedure that becomes a skip target on the basis of the priorities respectively associated with certain processing procedures included in the skill processing procedures associated with the first weapon and the second weapon, and to skip the decided certain processing procedure when the skill processing procedures are executed on the basis of a player input.

In this embodiment, the player object corresponding to the main character is displayed in the game field 50, and the assistant object corresponding to the assistant character is not displayed. Then, although a description has been given without specifically mentioning whether the player object is the lead object 52 or any of the following objects 53, it is possible to exercise the skills of a main character that corresponds to the lead object 52 and an assistant character or to exercise the skills of a main character that corresponds to the following object 53 and an assistant character. In the latter case, it is possible to execute the movement processing procedure in the skill of this following object 53 as movement of the lead object 52, thus moving the party object 51, or it is possible to make this following object 53 serve as a leader while the skills are exercised and to make the lead object 52 and the other following object 53 follow this following object 53.

Operations and Advantageous Effects

The electronic device 10 of this embodiment is an electronic device that executes a game upon reception of a player input and includes: the setting unit 231, which sets an association between a first game medium (first player object) that is selected by a player and that serves as an operation target in the game and a second game medium (second player object) that is selected by the player; the skip-processing-procedure deciding unit 232, which decides, on the basis of priorities respectively associated with skill-related processing procedures of the first game medium and the second game medium, the skill-related processing procedure that becomes a skip target; and the skill-processingprocedure executing unit 233, which executes skill processing procedures respectively associated with the first game medium and the second game medium, on the basis of a player input, wherein each of the skill-related processing procedures is at least a certain processing procedure in the skill processing procedure or is the skill processing procedure, and wherein the skill-processing-procedure executing unit 233 skips the decided skill-related processing procedure when the skill processing procedures associated with the first game medium and the second game medium are executed.

Accordingly, it is possible to realize various combinations of skills and to enhance the fun of the game. For example, when the skill processing procedure of the first game medium and the skill processing procedure of the second game medium are executed in parallel, even if conflicting processing procedures are included in part or in their entirety depending on the combination of the first game medium and the second game medium, the processing procedure that has a lower priority can be decided as a skip target, thereby enabling parallel processing procedures and realization of free combination.

In this embodiment, the skill-related processing procedures, with which the priorities are associated, are at least certain processing procedures included in the skill processing procedures. Accordingly, the range in which execution is ignored can be limited. In other words, improvement in the fun brought by combining the skill processing procedure of the first game medium and the skill processing procedure of the second game medium can be enjoyed to the fullest within the range in which there is no contradiction in processing procedures.

The second game medium is an assistant game medium that assists the first game medium, which serves as a main game medium; and the skip-processing-procedure deciding unit 232 decides the certain processing procedure of the second game medium as a skip target in the case where the priorities of the certain processing procedures of the first game medium and the second game medium are the same.

Accordingly, the skill processing procedure of the first game medium is prioritized, thereby making it easy for the player to understand and making it possible to enhance a sense of immersion in the game.

The skill processing procedure includes, as the certain processing procedure, at least a movement processing procedure related to movement of the first game medium in a game field in which the game is played; the priority includes a movement priority related to movement in the game field; the skill-processing-procedure executing unit 233 skips the movement processing procedure of the second game medium and executes the movement processing procedure of the first game medium, in the case where the skip-processing-procedure deciding unit 232 has determined that the movement priority of the second game medium is lower than that of the first game medium; and the skill-processing-procedure executing unit 233 skips the movement processing procedure of the first game medium and executes the movement processing procedure of the second game medium as movement of the first game medium in the game field, in the case where the skip-processing-procedure deciding unit 232 has determined that the movement priority of the first game medium is lower than that of the second game medium.

Accordingly, it is possible to avoid a situation in which conflicting movement modes of the first game medium and the second game medium are executed in parallel. For example, even in the case where the skill of the first game medium is to move this medium in the right direction in the game field, whereas the skill of the second game medium, which is associated with the first game medium, is to move this medium in the left direction in the game field, the movement processing procedure that has a lower movement priority is skipped, thereby making it possible to execute the skill processing procedures of both game media.

Embodiment Realized by System

Figure 9:
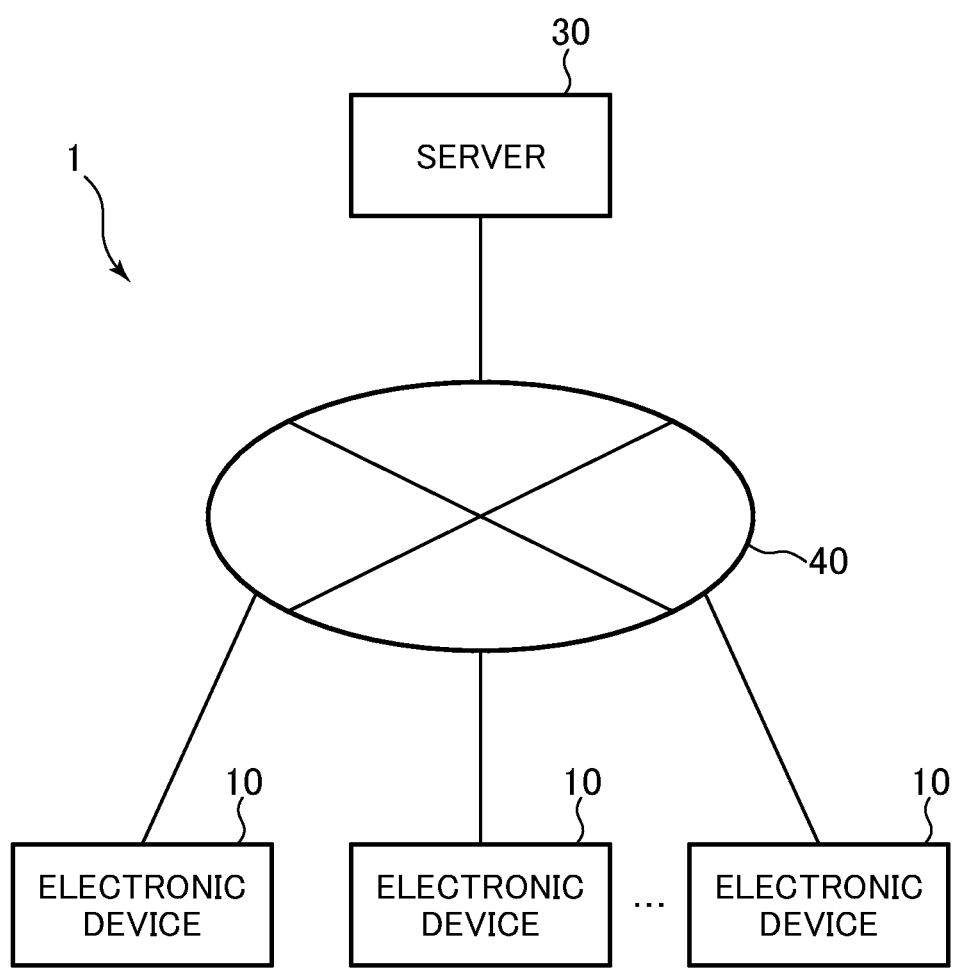
FIG. 9 is a view showing an example of the overall configuration of a game system according to the embodiment of the present invention.

FIG. 9 is a view showing an example of the overall configuration of a game system according to the embodiment of the present invention. As shown in FIG. 9, the game system 1 includes a plurality of electronic devices 10 and a server 30. Each of the electronic devices 10 and the server 30 are connected to a network 40, such as the Internet, so as to be able to communicate with each other. Note that, although a description will be given on the assumption that the game system 1 of this embodiment is a server/client system, the game system 1 can be configured of a system that does not include the server 30, like PtoP.

The electronic device 10 includes a hardware configuration similar to that shown in FIG. 1 and is a smartphone in this embodiment. The server 30 is a server device for providing a game that is executable at the electronic device 10 and is configured of one or a plurality of computers.

The server 30 stores various programs, such as a control program for controlling the proceeding of an online game, and various kinds of data used in the game.

In one example, the server 30 is configured so as to be able to provide a game application that is executable at the electronic device 10, to the electronic device 10. After executing the downloaded game application, the electronic device 10 sends data to and receives data from the server 30 regularly or as needed, to proceed with the game. For example, the server 30 stores various kinds of setting information and history information needed for the game executed at the electronic device 10. In this case, the electronic device 10 has the functions of the input unit 21, the display unit 22, the game control unit 23, and the individual functional units in the game control unit 23.

In one example, the server 30 is a web server and provides a game service to the electronic device 10. The electronic device 10 obtains HTML data for displaying a web page from the server 30 and displays the web page by analyzing the obtained HTML data. In this case, the server 30, which communicates with the electronic device 10, has certain functions of the game control unit 23. For example, the electronic device 10 accepts player's selection of a first player character and a second player character via the input unit 21 (input device 13), and the setting unit 231 of the server 30 sets an association between these characters. The electronic device 10 accepts a player input for exercising skills via the input unit 21 (input device 13), and the skip-processing-procedure deciding unit 232 and the skill-processing-procedure executing unit 233 of the server 30 execute the skill processing procedures and cause the display unit 22 (display device 12) of the electronic device 10 to display the skill productions.

In one example, the game system 1 provides a game that can be played by a plurality of users in one game field 50. For example, the collision objects 54 can be objects that are operated by the other user. Alternatively, the party object 51 can be made up of player objects corresponding to the plurality of users.

Another Embodiment

Although the movement priorities have been described as an example of the priorities in the above-described embodiment, the priorities may also be skill-production priorities or skill-effect priorities. In the case where the skill-production priorities are associated, skill-production display of a first player object and skill-production display of a second player object are weighted.

In one example, the skip-processing-procedure deciding unit 232 may skip the skill-production displaying processing procedure that has a lower skill-production priority as a skip target and execute skill-production displaying processing procedure that has a higher skill-production priority or may display a skill production that has a higher skill-production priority on a skill production that has a lower skill-production priority, in an overlapping manner, in the game field 50 on the display device 12. Note that, even if the skill-production displaying that has a lower skill-production priority is decided as a skip target or to be displayed in the lower layer, the skill effect processing procedure and/or the movement processing procedure of the player object of which the skill-production priority is determined to be lower are/is executed. The order of the skill-production priorities is set on the basis of flashiness of skill productions; for example, a higher priority is set for a flashy production. In this way, a flashy production is displayed preferentially, thereby making it possible to enhance a sense of immersion of the user during the play.

In another example, it is also possible that the skip-processing-procedure deciding unit 232 decides the skill-effect processing procedure (for example, increasing the duration of the attacking power by 3 seconds) in which the skill-effect expression period of time is shorter and that has a lower skill-effect priority, as a skip target, and executes the skill-effect processing procedure (for example, increasing the duration of the attacking power by 5 seconds) in which the skill-effect expression period of time is longer and that has a higher skill-effect priority. The priority order for the skill-effect processing procedures is set on the basis of the skill expression duration time; for example, a higher priority is set for that having a longer skill expression duration time. In this way, the skill that has a longer expression duration time is executed preferentially, thereby making it possible to enhance the fun of the game. In one example, since the skill-effect processing procedure that has a lower skill-effect priority is decided as a skip target, the skill itself having a lower skill-effect priority can be prevented from being exercised.

Regarding the priority setting, at least one of the movement priorities, the skill-production priorities, and the skill-effect priorities needs to be set.

It is also possible that the certain processing procedures, associated with the priorities, in the skill processing procedures include parameters that are related to the corresponding processing procedures and that are weighted on the basis of the priorities, and the skill-processing-procedure executing unit 233 executes the skill processing procedures of the first player object and the second player object on the basis of the parameters. Accordingly, various skills can be exercised, thus making it possible to enhance the fun of the game.

For example, in the case where the movement priorities are set as the priorities, the movement priority of the first player object is higher than that of the second player object, and the movements of the first player object and the second player object are movement in the right direction and movement in the upward direction, it is possible that the movements are treated as vectors, and the game control unit 23 performs calculation for synthesizing the result obtained by multiplying a movement vector A of the first player object by a scalar (for example, by 3) on the basis of the movement priority thereof and the result obtained by multiplying a movement vector B of the second player object by a scalar (for example, by 1) on the basis of the movement priority thereof, to move the first player object according to the calculation result (that is, 3A+B). This processing using weighting based on the priorities may be performed in addition to the mode in which a certain processing procedure associated with the priority is skipped or may be independently performed in a mode that does not include such skipping processing.

In another embodiment of the present invention, it is also possible to provide: a program that realizes the functions and the information processing steps shown in the flowcharts in the above-described embodiment of the present invention; and a computer-readable storage medium that has stored the program. Furthermore, in still another embodiment, it is also possible to provide a method for realizing the functions and the information processing steps shown in the flowcharts in the above-described embodiment of the present invention. Furthermore, in still another embodiment, it is also possible to provide a server capable of supplying, to a computer, a program that realizes the functions and the information processing steps shown in the flowcharts in the above-described embodiment of the present invention. Furthermore, in still another embodiment, it is also possible to provide a virtual machine that realizes the functions and the information processing steps shown in the flowcharts in the above-described embodiment of the present invention.

The processing or operation described above can be modified freely as long as no inconsistency arises in the processing or operation, such as an inconsistency that a certain step utilizes data that may not yet be available in that step. Furthermore, the examples described above are examples for explaining the present invention, and the present invention is not limited to those examples. The present invention can be embodied in various forms as long as there is no departure from the gist thereof.

REFERENCE SIGNS LIST 1 game system
10 electronic device
11 processor
12 display device
13 input device
13a touchscreen
14 storage device
15 communication device
16 bus
21 input unit
22 display unit
23 game control unit
231 setting unit
232 skip-processing-procedure deciding unit
233 skill-processing-procedure executing unit
30 server
40 network
50 game field
51 party object
52 lead object
53 following object
54 collision object
54a enemy object
54b attack object
54c wall
55 operation object 55a one end section
55b other end section

The invention claimed is:

1. A non-transitory computer readable medium storing a program for a game to be executed at an electronic device that accepts a player input, the program characterized by causing the electronic device to function as:
a setting means for setting an association between a first game medium that is selected by a player and that serves as an operation target in the game and a second game medium that is selected by the player;
a skip-processing-procedure deciding means for deciding, on the basis of priorities respectively associated with skill-related processing procedures of the first game medium and the second game medium, the skill-related processing procedure that becomes a skip target; and
a skill-processing-procedure executing means for executing skill processing procedures respectively associated with the first game medium and the second game medium, on the basis of a player input,
the program characterized in that each of the skill-related processing procedures is at least a certain processing procedure in the skill processing procedure or is the skill processing procedure, and
the program characterized in that the skill-processing-procedure executing means skips the decided skill-related processing procedure when the skill processing procedures associated with the first game medium and the second game medium are executed.

2. The non-transitory computer readable medium according to claim 1, characterized in that each of the skill-related processing procedures is at least a certain processing procedure in the skill processing procedure.

3. The non-transitory computer readable medium according to claim 2, characterized in that:
the second game medium is an assistant game medium that assists the first game medium, which serves as a main game medium; and
the skip-processing-procedure deciding means decides the certain processing procedure of the second game medium as the skip target in the case where the priorities of the certain processing procedures of the first game medium and the second game medium are the same.

4. The non-transitory computer readable medium according to claim 2, characterized in that the skill processing procedure includes the certain processing procedure, with which the priority is associated, and another processing procedure with which the priority is not associated.

5. The non-transitory computer readable medium according to claim 2, characterized in that the certain processing procedure includes at least one of a movement processing procedure, a skill-production displaying processing procedure, and a skill-effect processing procedure.

6. The non-transitory computer readable medium according to claim 2, characterized in that:
the skill processing procedure includes, as the certain processing procedure, at least a movement processing procedure related to movement of the first game medium in a game field in which the game is played;
the priority includes a movement priority related to movement in the game field;
the skill-processing-procedure executing means skips the movement processing procedure of the second game medium and executes the movement processing procedure of the first game medium, in the case where the skip-processing-procedure deciding means has determined that the movement priority of the second game medium is lower than that of the first game medium; and
the skill-processing-procedure executing means skips the movement processing procedure of the first game medium and executes the movement processing procedure of the second game medium as movement of the first game medium in the game field, in the case where the skip-processing-procedure deciding means has determined that the movement priority of the first game medium is lower than that of the second game medium.

7. The non-transitory computer readable medium according to claim 2, characterized in that:
the certain processing procedure includes a parameter that is related to this processing procedure and that is weighted on the basis of the priority; and
the skill-processing-procedure executing means executes the skill processing procedures of the first game medium and the second game medium on the basis of the parameters.

8. The non-transitory computer readable medium according to claim 2, characterized in that the setting means accepts, through a player input, the first game medium and the second game medium selected by the player from a group of game media.

9. An electronic device that executes a game upon reception of a player input, the electronic device characterized by comprising:
a setting means for setting an association between a first game medium that is selected by a player and that serves as an operation target in the game and a second game medium that is selected by the player;
a skip-processing-procedure deciding means for deciding, on the basis of priorities respectively associated with skill-related processing procedures of the first game medium and the second game medium, the skill-related processing procedure that becomes a skip target; and
a skill-processing-procedure executing means for executing skill processing procedures respectively associated with the first game medium and the second game medium on the basis of a player input,
the electronic device characterized in that each of the skill-related processing procedures is at least a certain processing procedure in the skill processing procedure or is the skill processing procedure, and
the electronic device characterized in that the skill-processing-procedure executing means skips the decided skill-related processing procedure when the skill processing procedures associated with the first game medium and the second game medium are executed.

10. A method for a game to be executed at an electronic device that accepts a player input, the method characterized by comprising:
a setting step for setting an association between a first game medium that is selected by a player and that serves as an operation target in the game and a second game medium that is selected by the player;
a skip-processing-procedure deciding step for deciding, on the basis of priorities respectively associated with skill-related processing procedures of the first game medium and the second game medium, the skill-related processing procedure that becomes a skip target; and
a skill-processing-procedure executing step for executing skill processing procedures respectively associated with the first game medium and the second game medium on the basis of a player input, the method characterized in that each of the skill-related processing procedures is at least a certain processing procedure in the skill processing procedure or is the skill processing procedure, and the method characterized in that, in the skill-processing-procedure executing step, the decided skill-related processing procedure is skipped when the skill processing procedures associated with the first game medium and the second game medium are executed.

11. A system for a game to be executed upon reception of a player input, the system characterized by comprising an electronic device and a server that is connected to the electronic device via a network, the electronic device or the server functioning as a setting means for setting an association between a first game medium that is selected by a player and that serves as an operation target in the game and a second game medium that is selected by the player, the electronic device or the server functioning as a skip-processing-procedure deciding means for deciding, on the basis of priorities respectively associated with skill-related processing procedures of the first game medium and the second game medium, the skill-related processing procedure that becomes a skip target, and the electronic device or the server functioning as a skill-processing-procedure executing means for executing skill processing procedures respectively associated with the first game medium and the second game medium on the basis of a player input, the system characterized in that each of the skill-related processing procedures is at least a certain processing procedure in the skill processing procedure or is the skill processing procedure, and the system characterized in that the skill-processing-procedure executing means skips the decided skill-related processing procedure when the skill processing procedures associated with the first game medium and the second game medium are executed.

* * * * *